July 15, 1947.  E. D. CHAPLIN  2,424,149
DRY CELL
Filed April 10, 1944
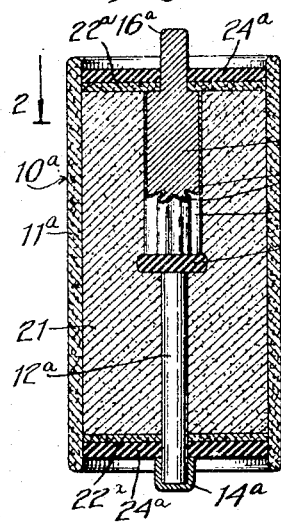
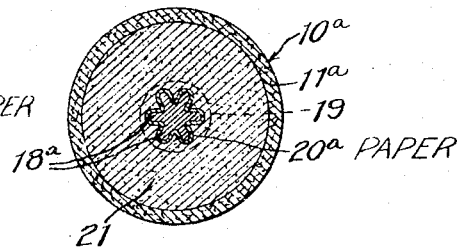
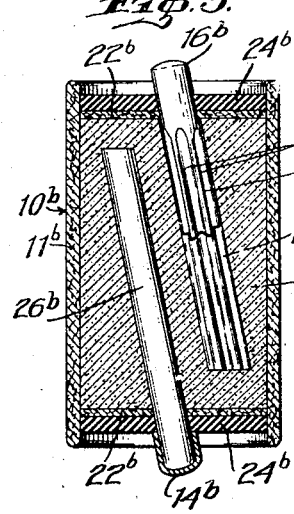
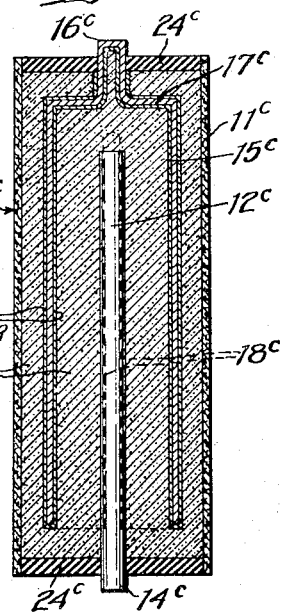
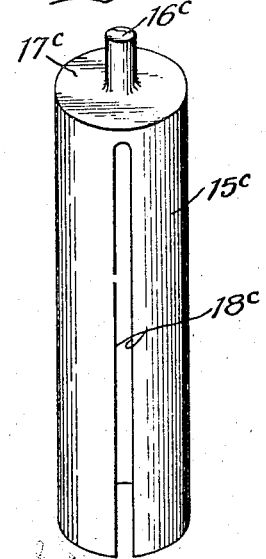
INVENTOR
EDWIN D. CHAPLIN
BY H. M. Kilpatrick
ATTORNEY Patented July 15, 1947

2,424,149

UNITED STATES PATENT OFFICE 2,424,149

DRY CELL

Edwin D. Chaplin, New York, N. Y., assignor to Harry B. Albert, New York, N. Y.

Application April 10, 1944, Serial No. 530,360

4 Claims. (Cl. 136—107)

This invention relates to dry cells and to methods for preventing the loss or waste of zinc in the manufacture and usage of electrodes formed therefrom and more particularly to leakproof cells in which zinc will be electrolytically attacked along successive areas, beginning at the innermost or non-terminal ends of the zinc.

One object of the invention is to provide an improved device or apparatus of this kind which assures the integrity of zinc electrodes so that no portion thereof may become separated from and out of contact with electrode terminal as the zinc is consumed, and which does not allow escape of moisture as the consumption nears completion.

Other objects of the invention are to provide an improved device of this kind which employs the use of easily formed electrodes and to provide a method for making electrodes in a single stamping operation from a strip of zinc.

Additional objects of the invention are to effect simplicity and efficiency in such methods and apparatus and to provide an extremely simple device or apparatus of this kind which is economical, durable, and reliable in operation, and economical to manufacture and safe to use.

Still other objects of the invention will appear as the description proceeds; and while herein details of the invention are described in the specification many and various changes may be made without departing from the scope of the invention.

The inventive features for the accomplishment of these and other objects are shown herein in connection with a dry cell which briefly stated, includes a leakproof casing and positive and negative electrodes therein having terminal portions projecting through opposite ends of the casing and an electrolyte surrounding and in active contact with the electrodes.

In the accompanying drawing, showing, by way of example, three of many possible embodiments of the invention, Fig. 1 is a longitudinal sectional view showing one form of the cell;

Fig. 2 is a transverse sectional view showing the cell the section being taken substantially on the line 2—2 of Fig. 1. looking in the direction of the arrows of said line;

Fig. 3 is a longitudinal sectional view showing another form of the cell;

Fig. 4 is a longitudinal sectional view showing still another form of the cell; and Fig. 5 is a perspective view of the zinc electrode as shown in Fig. 4.

A dry cell 10a as shown in Figs. 1 and 2 comprises a substantially cylindrical casing 11a of waterproofed paper, fiber, plastic or other suitable material in which is disposed a carbon rod 12a having its outer end 14a projecting as a terminal beyond one end of the casing substantially at the axis thereof and the remainder of the rod extending about half-way into the casing, and preferably in axial alinement therewith. A zinc electrode 15a, likewise has its outer end 16a projecting as a terminal beyond the other end of the casing substantially at the axis thereof and the remainder of the electrode extending about half-way into the casing and alined with the rod. The inner end portion of the electrode may be provided with fins 18a for increasing its active area if desired or the fins may be omitted.

An insulating disk or wad 19 intermediate of the inner ends of the rod and electrode aids in preventing electrical contact therebetween but may be omitted. A covering, wrapper or diaphragm of porous or absorbent paper 20a or other suitable absorbent material adjacent the zinc electrode within the casing may be employed in the usual manner as an absorber for an electrolyte solution such as aqueous zinc chloride and ammonium chloride, these being well known in the art. A depolarizer comprising a mixture 21 of well known composition such as a mixture of crushed coke, graphite, and manganese dioxide is packed within the cell in contact with the carbon rod and outer surface of the diaphragm 20a in a manner well known to the art. It is also customary in the art to impregnate the depolarizer with the electrolyte solution. A non-conducting washer 22a at each end portion of the casing serves to close the annular area between the projecting terminals and the casing and also to protect the mixture when melted suitable material such as sealing wax, asphalt, rosin, etc., is applied to form an annular sealing 24a covering the exterior faces of said washers to prevent the escape of moisture and gases from the paste. One or both of the washers 22a may be omitted if the seal and mixture do not injure each other.

In another form of the invention as shown in Fig. 3 a dry cell 10b comprises a substantially cylindrical casing 11b of waterproofed paper, fiber, plastic or other suitable material in which is disposed a carbon rod 12b having its outer end 14b projecting as a terminal beyond one end of the casing substantially at the axis thereof and the remainder of the rod extending into the casing, and inclined to the axis of the casing. A zinc electrode 15b likewise has its outer end 16b projecting as a terminal beyond the other end of the casing substantially at the axis thereof and the remainder of the electrode extending into the casing alongside and substantially parallel to the rod and spaced therefrom. The inner end portion of the electrode may be provided with grooves 18b for increasing its active area if desired, or the grooves may be omitted.

A covering or wrapper of porous or absorbent paper 20b or other suitable absorbent material adjacent the zinc electrode within the casing may be employed in the usual manner as an absorber and diaphragm to separate the zinc from the depolarizer or mixture 21 as previously described of the embodiment shown in Fig. 1. Each end portion of the cell is closed by washers 22b and seals 24b in a manner similar to that of their counterparts in Fig. 1.

In another form of the invention as shown in Fig. 4 a dry cell 10c comprises a substantially cylindrical casing 11c of waterproof material such as paper, fiber, plastic or other suitable material in which is disposed a carbon rod 12c having its outer end 14c projecting as a terminal beyond one end of the casing substantially at the axis thereof and the remainder of the rod extending into the casing, and preferably alined with the axis thereof. A hollow substantially cylindrical zinc electrode 15c has its outer end 16c of reduced diameter projecting as a terminal slightly beyond the other end of the casing substantially at the axis thereof and the remainder or body of the electrode extends into the casing in axial alinement therewith and spaced from the rod and casing. The outer end of the electrode is closed by means of a disk 17c as an integral part thereof, said disk being provided with a terminal tip 16c drawn or stamped from the disk and projecting beyond the casing. The electrode may be circumferentially continuous or be provided with a pair of long longitudinal diametric slots 18c thereby forming curved sheets as will be explained later herein.

A layer of porous paper 20c or other suitable material may be provided as a diaphragm to cover the active surfaces, including the inner and outer faces, of the electrode. The previously described depolarizing mixture 21 is provided within the annular space between the rod and the covered electrode and that space between the electrode and the casing. The innermost end of the electrode is in contact with electrolyte. A seal 24c of sealing wax, asphalt or other suitable material is provided to close the annular space between the projecting exposed terminals 14c and 16c and the casing at each end of the cell to prevent leakage of gases and moisture from the interior. The electrolyte as described of Fig. 1 and absorbed in the paper 20c may be in operable contact with all surfaces of the zinc except the outer surface of the terminal tip 16c passing through the seal so that a maximum area of the electrode is subjected to electrolyte action.

The electrode 15c may be easily formed from a rectangular strip of zinc slightly wider than the diameter of the body of the electrode so that no waste attends its formation. The strip may be shaped by stamping in the ordinary manner by employing a female die having a diameter equal to that of the body of the electrode and forcing the mid-portion of the strip into the die with a male cylindrical die of slightly less diameter. This action causes the ends of the strip to be folded back toward each other and to become inwardly curved leaving the longitudinal slots 18c. The side margins of the strip at its midportion are turned inwardly making the body continuously cylindrical intermediate to the disk and slot to strengthen the disk. Narrower strips may be used so that the slots will extend to the disk. The terminal tip 16c may easily be formed during the same operation for forming the arms and disk by the use of auxiliary male and female dies.

In any form of the cell as shown it will be seen that the inner end of the zinc is nearer than any other zinc portion to the carbon terminal. With such a location, the flow of the internal current in the cell will tend to be more concentrated nearer the terminal end of the carbon rod where the length of the relatively high resistance carbon is shortest. The corrosion of the zinc is consequently greater in the area of greater current density so that the zinc is progressively attacked from its inner to outer end and the integrity of the electrode is maintained.

The invention claimed is:

1. A dry cell comprising in combination a substantially cylindrical casing of waterproof material; a carbon rod having its outer end projecting as a terminal beyond one end of the casing substantially at the axis thereof and the remainder of the rod extending into the casing, and alined with the axis thereof; a substantially cylindrical zinc electrode having a terminal projecting beyond the other end of the casing substantially at the axis thereof and the remainder of the electrode extending into the casing and developed radially to form a disk with substantially semi-cylindrical curved sheets of zinc as integral parts of said electrode and developed at the peripheral portion of the disk and embracing the carbon rod; a layer of porous material covering the active surface of the zinc electrode; a depolarizer packed within the casing and filling and surrounding the electrode and in contact with the carbon; and a non-conducting seal at each end portion of the casing to close the annular area between the projecting terminals and the casing.

2. A cell as in claim 1 said porous material being in contact with the inner end of said zinc electrode and the outer surface of the disk, and an electrolyte absorbed in the porous material.

3. A zinc electrode for a dry cell comprising a zinc disk; two arms integral with the disk and extending from the periphery thereof and separated from each other by slots except for a short flange portion at the disk integral with the disk and arms.

4. An electrode as in claim 3 said arms being almost semi-cylindrical sheets parallel to the axis of the disk.

EDWIN D. CHAPLIN.

REFERENCES CITED

The following references are of record in the file of this patent:

UNITED STATES PATENTS

| Number | Name | Date |
|---|---|---|
| 636,318 | Burroughs | Nov. 7, 1899 |
| 350,621 | Drescher | Oct. 12, 1886 |
| 406,223 | Lee | July 2, 1889 |
| 742,365 | Strickland | Oct. 27, 1903 |
| 1,667,317 | Heise et al. | Apr. 24, 1928 |
| 2,358,745 | Stieglitz | Sept. 19, 1944 |
| 653,590 | Post | July 10, 1900 |
| 1,725,592 | Mertes | Aug. 20, 1929 |
| 611,175 | Krayn et al. | Sept. 20, 1898 |

FOREIGN PATENTS

| Number | Country | Date |
|---|---|---|
| 9,948/32 | Australia | 1932 |

OTHER REFERENCES

Knowlton, A. E., Standard Handbook for Electrical Engineers, 7th edition (1941), page 1974. (Copy in Scientific Library.)